United States Patent
Kanesalingam et al.

(10) Patent No.: US 10,159,109 B2
(45) Date of Patent: Dec. 18, 2018

(54) SYSTEM AND METHOD FOR SUPPORTING TIME-SENSITIVE SERVICES IN A COMMUNICATION NETWORK

(71) Applicant: Telefonaktiebolaget LM Ericsson (publ), Stockholm (SE)

(72) Inventors: Prabaharan Kanesalingam, Ottawa (CA); Chandra Sekhar Bontu, Nepean (CA); Alexander Langereis, Sigtuna (SE); Patrick Lie Chin Cheong, Kanata (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 49 days.

(21) Appl. No.: 15/318,223

(22) PCT Filed: Jul. 18, 2014

(86) PCT No.: PCT/IB2014/063226
§ 371 (c)(1),
(2) Date: Dec. 12, 2016

(87) PCT Pub. No.: WO2015/198105
PCT Pub. Date: Dec. 30, 2015

(65) Prior Publication Data
US 2017/0142775 A1  May 18, 2017

Related U.S. Application Data (60) Provisional application No. 62/018,027, filed on Jun. 27, 2014.

(51) Int. Cl.
*H04W 4/00* (2018.01)
*H04W 76/28* (2018.01)
(Continued)

(52) U.S. Cl.
CPC .......... *H04W 76/28* (2018.02); *H04M 7/006* (2013.01); *H04W 52/0216* (2013.01);
(Continued)

(58) Field of Classification Search
CPC ................................................ H04W 72/0413
See application file for complete search history.

(56) References Cited

U.S. PATENT DOCUMENTS

2007/0127425 A1* 6/2007 Keidar .............. H04W 52/0229
370/338
2009/0279466 A1* 11/2009 Ji ...................... H04W 52/0232
370/311

(Continued)

FOREIGN PATENT DOCUMENTS

EP        2079269 A2      7/2009
WO    2009/088496 A1      7/2009
(Continued)

OTHER PUBLICATIONS

International Search Report and Written Opinion dated Feb. 18, 2015 for International Application Serial No. PCT/IB2014/063226, International Filing Date: Jul. 18, 2014 consisting of 11-pages.

*Primary Examiner* — Farah Faroul
(74) *Attorney, Agent, or Firm* — Christopher & Weisberg, P.A.

(57) ABSTRACT

A node and method for extending a wake up time of a wireless user equipment (UE) are provided. The node includes a memory. The memory is configured to store data to be transmitted to the UE. The node includes a processor configured to determine if the memory is storing data to be transmitted to the UE, determine if the wake up time of the UE coincides with a periodic subframe, the periodic subframe occurring with a periodicity and cause transmission of a message for a grant to the UE if the determination is made
(Continued)

that the memory is storing data to be transmitted to the UE and the wake up time of the UE coincides with the periodic subframe.

24 Claims, 11 Drawing Sheets

(51) Int. Cl.
  *H04W 76/38* (2018.01)
  *H04W 76/27* (2018.01)
  *H04M 7/00* (2006.01)
  *H04W 72/00* (2009.01)
  *H04W 72/04* (2009.01)
  *H04W 72/14* (2009.01)
  *H04W 52/02* (2009.01)

(52) U.S. Cl.
  CPC ....... *H04W 72/005* (2013.01); *H04W 72/042* (2013.01); *H04W 72/0413* (2013.01); *H04W 72/0446* (2013.01); *H04W 72/14* (2013.01); *H04W 76/27* (2018.02); *H04W 76/38* (2018.02)

(56) References Cited

U.S. PATENT DOCUMENTS

| | | | |
|---|---|---|---|
| 2009/0316593 A1 | 12/2009 | Wang et al. | |
| 2010/0329170 A1* | 12/2010 | Wu | H04W 72/005 370/312 |
| 2011/0013574 A1* | 1/2011 | Hsu | H04W 72/005 370/329 |
| 2013/0272121 A1 | 10/2013 | Stanwood et al. | |
| 2014/0071860 A1* | 3/2014 | Susitaival | H04W 52/0216 370/280 |
| 2014/0348107 A1* | 11/2014 | Dalsgaard | H04W 52/0251 370/329 |
| 2015/0043441 A1* | 2/2015 | Kanamarlapudi | H04W 72/0486 370/329 |
| 2015/0117284 A1* | 4/2015 | Baldemair | H04L 1/0026 370/311 |
| 2015/0201375 A1* | 7/2015 | Vannithamby | H04W 4/70 370/311 |
| 2015/0250017 A1* | 9/2015 | Ingale | H04B 7/2615 370/280 |
| 2015/0264697 A1* | 9/2015 | Fong | H04W 72/0406 370/329 |
| 2015/0305083 A1* | 10/2015 | Heo | H04W 4/70 370/329 |
| 2016/0192433 A1* | 6/2016 | Deenoo | H04W 72/046 370/329 |
| 2016/0286603 A1* | 9/2016 | Vajapeyam | H04W 74/08 |
| 2017/0202055 A1* | 7/2017 | Feuersaenger | H04W 76/048 |
| 2017/0251519 A1* | 8/2017 | Ohlsson | H04W 76/048 |
| 2017/0318620 A1* | 11/2017 | Tseng | H04W 72/0413 |

FOREIGN PATENT DOCUMENTS

| | | |
|---|---|---|
| WO | 2009/119477 A1 | 10/2009 |
| WO | 2014/035074 A1 | 3/2014 |

* cited by examiner

SYSTEM AND METHOD FOR SUPPORTING TIME-SENSITIVE SERVICES IN A COMMUNICATION NETWORK

CROSS-REFERENCE TO RELATED APPLICATIONS

This application is a Submission Under 35 U.S.C. § 371 for U.S. National Stage Patent Application of International Application Number: PCT/IB2014/063226, filed Jul. 18, 2014, entitled "SYSTEM AND METHOD FOR SUPPORTING TIME-SENSITIVE SERVICES IN A COMMUNICATION NETWORK," which claims priority to U.S. Provisional Patent Application No. 62/018,027, filed Jun. 27, 2014, entitled "SYSTEM AND METHOD FOR SUPPORTING TIME-SENSITIVE SERVICES IN A COMMUNICATION NETWORK", the entirety of both of which are incorporated herein by reference.

FIELD

The present disclosure relates to a node, method and system for a communication network, and in particular to dynamically handling collisions between periodic subframes and wake up times for user equipment.

BACKGROUND

As specified in Third Generation Partnership Project Technical Specification (3GPP TS) 36.331, Radio Resource Control, v. 12.1.0, some of the available subframes within a finite number of consecutive radio frames (or system frames) are allocated to Multimedia Broadcast Multicast Service (MBMS), when the MBMS service is enabled. This MBMS subframe allocation can be repeated periodically. The periodicity can be set to one, two, four, eight, sixteen or thirty-two radio frames. The standard further specifies ways to extend the periodicity to 64, 128 and 256 radio frames. These defined procedures give flexibility to the operator to adjust the bandwidth allocation for MBMS services. Normally MBMS subframe allocation is semi-statically configured. The MBMS subframe pattern is indicated in a System Information Block 2 (SIB2) broadcast message as part of the Multicast Broadcast Single-Frequency Network (MBSFN) SubframeConfiguration Information Element (IE). MBMS service can be configured on any subframes except on subframes 0, 4, 5 and 9 for Frequency Division Duplex (FDD) or subframes 0, 1, 2, 5 and 6 for Time Division Duplex (TDD) within a radio frame. The percentage of the available bandwidth (or radio resources) that can be allocated to MBMS service is limited to 60. These evolved MBMS (eMBMS) subframes (or MBSFN subframes) are only available for eMBMS transmissions once these radio resources are allocated for broadcast/multi-cast services, i.e., they typically can't be used for unicast traffic like for example Voice over Long Term Evolution (VoLTE) or File Transfer Protocol (FTP) for non Transmission Mode 9 (TM9) & TM10 UEs. Even for TM9 and TM10 UEs, once radio resources are dimensioned properly, there will not be any un-used resources within the eMBMS subframes available for unicast DL transmission. UEs, which are not interested in the multicast service, listen to the SIB2 messages but may and skip the MBMS subframes by just reading the Physical Downlink Control Channel (PDCCH).

Discontinuous Reception—DRX

Figure 1:
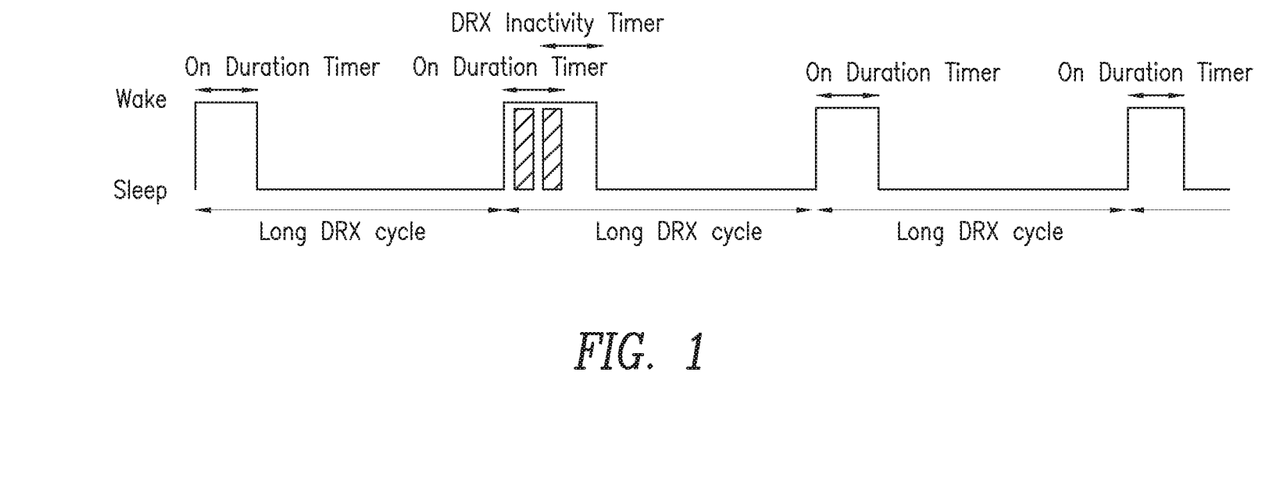
FIG. 1 illustrates an example of discontinuous reception (DRX)

User equipment manufacturers and system service providers seek arrangements to maximize the battery life of user equipment. One method for doing so is through the use of discontinuous reception (DRX). As is shown in FIG. 1, discontinuous reception (DRX) reduces battery consumption in the user equipment (UE) by limiting the time when receptions need to be monitored by the UE. The UE can only be scheduled in the Downlink (DL) when the UE monitors the PDCCH. This implies that the UE can only be scheduled during periods of time when the UE is awake (also known as the "active time", "wake time" or "on duration"). In LTE networks, UEs normally use a timer referred to as the "onDuration" timer to determine when it needs to be awake. Of note, in some scenarios, UEs may additionally also use other timers to track the wake time, e.g., the DRX inactivity timer, DRX retransmission timer and/or Medium Access Control (MAC) contention resolution timer. It is advantageous to spread the wake time of the UEs in order to spread the load due to scheduling in time. This means that the Evolved Node B (eNB) base station attempts to configure the DRX for UEs so that the UEs do not have simultaneous wake times.

Voice Over IP for Long Term Evolution (VoLTE):

In LTE, all packets are delivered using the Internet Protocol (IP). This also applies to traditional circuit switched services which make use of scheduling using IP. This is called Voice over IP (VoIP). In a typical VoIP arrangement, a voice encoder on the transmitter side encodes the speech into packets with atypical speech duration of 20 ms. Voice over LTE (VoLTE) enables LTE networks to provide voice services. The mouth-to-ear delay introduced by the transport scheduling and transmission of the VoLTE packets is one of the main factors determining the experienced speech quality. This necessitates a relatively tight delay budget for VoLTE to ensure good speech quality. Up to the limit of the delay budget, the speech quality is usually acceptable. This means that it is generally sufficient to schedule a VoLTE service once every 40 ms and bundle two packets. Such a scheduling method allows for a good balance between efficient resource usage and sufficient speech quality.

VoLTE & DRX

To conserve the battery power of the UE, VoLTE users may operate with DRX enabled. Typically, the DRX period is set to 20 ms without packet bundling or 40 ms with packet bundling with the DRX ON time (also referred to as active time or wake time) set to more than one subframe. Further, when the DRX is enabled, the connected UEs monitor PDCCH while it is awake, i.e., while the onDuration timer, DRX inactivity timer, DRX retransmission timer and/or MAC contention resolution timer is running.

VoLTE, DRX & eMBMS

When eMBMS co-exists with VoLTE, the available subframes for DL transmission of VoIP packets are reduced by eMBMS. Further, when DRX is enabled, the connected UEs do not monitor PDCCH continuously but only during the wake time.

Since both DRX and eMBMS reduce the available subframes where the UE can be scheduled in DL, a combination of these features can reduce the possible subframes available for downlink transmission to one or even zero subframes. The eNB then needs to wait for another opportunity to schedule the UE, i.e., in some instances, the scheduling of DL packets to the UE may be delayed. As noted above, for VoLTE, packet delay is an important factor determining the perceived quality. The aforementioned problem can reduce the VoLTE performance even when only a small number of VoLTE UEs are present in the cell, i.e. it is a problem that not only occurs at high load but also during small network loads. Although the voice quality can be partially recovered if DRX is disabled for the VoLTE Radio Access Bearers (RABs), the improvement would be obtained at the expense of battery drain at the VoLTE UEs, which is undesirable.

SUMMARY

The present disclosure advantageously provides a method and system for dynamically handling collisions between periodic subframes and DRX wake up times to avoid unnecessary UE battery drain while still providing acceptable quality for delay sensitive services such as VoLTE.

According to one embodiment of the disclosure, a node for extending a wake up time of a wireless user equipment (UE) is provided. The node includes a memory. The memory is configured to store data to be transmitted to the UE. The node includes a processor configured to determine if the memory is storing data to be transmitted to the UE, determine if the wake up time of the UE coincides with a periodic subframe, the periodic subframe occurring with a periodicity and cause transmission of a message for a grant to the UE if the determination is made that the memory is storing data to be transmitted to the UE and the wake up time of the UE coincides with the periodic subframe.

According to one aspect of this embodiment, the grant to the UE is configured to cause the UE to extend the wake up time of the UE. The grant to the UE being transmitted to the UE during a non-extended portion of the wake up time of the UE.

According to another aspect of this embodiment, the data to be transmitted to the UE is scheduled for transmission after the periodic subframe and within a non-periodic subframe during the extended wake up time of the UE.

According to another aspect of this embodiment, the wake up time of the UE is a discontinuous reception (DRX) active time.

According to another aspect of this embodiment, the message for grant to the UE is configured to cause the UE to reset a DRX inactivity timer of the UE.

According to another aspect of this embodiment, the subframe is one of a set of subframes defining a frame.

According to another aspect of this embodiment, the periodicity is a number of frames.

According to another aspect of this embodiment, the data to be transmitted to the UE is a retransmission, and the determination that the wake up time of the UE coincides with the periodic subframe includes a determination that a scheduled time for the retransmission coincides with the periodic subframe.

According to another aspect of this embodiment, the periodic subframe is a Multimedia Broadcast Multicast Server (MBMS) subframe.

According to another aspect of this embodiment, the data to be transmitted to the UE is Voice over Internet Protocol (VoIP) data.

According to another aspect of this embodiment, the message for grant to the UE is an uplink grant to the UE.

According to another aspect of this embodiment, the uplink grant to the UE is transmitted within the periodic subframe.

According to another aspect of this embodiment, the uplink grant indicates a non-zero Transport Block Size (TBS).

According to another aspect of this embodiment, the uplink grant to the UE is transmitted within at least one Physical Downlink Control Channel (PDCCH) resource of the periodic subframe.

According to another embodiment, a method for extending a wake up time of a wireless user equipment (UE) is provided. A determination is made if a memory of a node is storing data to be transmitted to the UE. A determination is made if the wake up time of the UE coincides with a periodic subframe, the periodic subframe occurring with a periodicity. A message for a grant to the UE is caused to be transmitted if the determination is made that the memory is storing data to be transmitted to the UE and the wake up time of the UE coincides with the periodic subframe.

According to an aspect of this embodiment, the grant to the UE is configured to cause the UE to extend the wake up time of the UE. The grant to the UE is transmitted to the UE during a non-extended portion of the wake up time of the UE.

According to another aspect of this embodiment, the data to be transmitted to the UE is scheduled for transmission after the periodic subframe and within a non-periodic subframe during the extended wake up time of the UE.

According to another aspect of this embodiment, the wake up time of the UE is a discontinuous reception (DRX) active time.

According to another aspect of this embodiment, the message for grant to the UE is configured to cause the UE to reset a DRX inactivity timer of the UE.

According to another aspect of this embodiment, the subframe is one of a set of subframes defining a frame.

According to another aspect of this embodiment, the periodicity is a number of frames.

According to another aspect of this embodiment, the data to be transmitted to the UE is a retransmission, and the determination that the wake up time of the UE coincides with the periodic subframe includes determining that a scheduled time for the retransmission coincides with the periodic subframe.

According to another aspect of this embodiment, the periodic subframe is a Multimedia Broadcast Multicast Server (MBMS) subframe.

According to another aspect of this embodiment, the data to be transmitted to the UE is Voice over Internet Protocol (VoIP) data.

According to another aspect of this embodiment, the message for grant to the UE is an uplink grant to the UE.

According to another aspect of this embodiment, the uplink grant to the UE is transmitted within the periodic subframe.

According to another aspect of this embodiment, the uplink grant indicates a non-zero Transport Block Size (TBS).

According to another aspect of this embodiment, the uplink grant to the UE is transmitted within at least one Physical Downlink Control Channel (PDCCH) resource of the periodic subframe.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

The embodiments described herein advantageously provide a node, method and system for dynamically handling collisions between periodic subframes and DRX wake up times. Accordingly, the node, method and system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements.

The embodiments disclosed herein are directed to methods and systems for extending the DRX wake up time of a UE when the DRX wake up time collides or coincides with a periodic subframe having a periodicity. The periodicity may be expressed as a number of frames.

While the embodiments described herein are with respect to eMBMS subframes, the present disclosure is not limited to eMBMS subframes, and is equally applicable to other systems where periodic subframes are scheduled. Groups of DL subframes may be semi-statically allocated or configured by the eNB for the purpose of dedicated services, such as, broadcast/multicast services, e.g., MBMS, packet-forwarding to relay nodes (RNs), almost-blank subframes (ABS) for supporting enhanced ICIC, Observed Time Difference Of Arrival (OTDOA) subframes for E911 services, eMBMS Reserved Cells, etc. In the latter case, Reserved Cells are cells configured within or adjacent to a Multicast Broadcast Single Frequency Network (MBSFN) Area (which 3GPP TS 36.300 defines as a group of cells within an MBSFN Synchronization Area of a network which are coordinated to perform MBSFN Transmissions). Except for MBSFN Area Reserved Cells, all cells within an MBSFN Area contribute to MBSFN Transmissions and advertise their availability. The UE may only need to consider a subset of the MBSFN Areas that are configured, i.e., when the UE knows which MBSFN Area applies for the service(s) the UE is interested in receiving.

To reduce or eliminate interference to the MBMS service, the subframes configured as MBSFN subframes in the MBSFN Area are left unused by the Reserved Cells. When delay or time-sensitive applications are scheduled within Reserved Cell coverage, these "blank" sub frames have to be considered. The Reserved Cells are configured with an eMBMS subframe pattern but are not used for eMBMS or unicast traffic. 3GPP is currently discussing a new (pre-defined) format for these sub frames, referred as New Carrier Type (NCT). These subframes are envisioned to cater to the needs of future (upcoming) applications. However, even if those unused sub frames are reformatted, they might nevertheless also impact the performance of time-sensitive services. The base station scheduler should be aware of these dedicated or periodic subframes occurring during the DRX ON duration for UEs with delay-sensitive-radio access bearers (RABs) or otherwise configured for time-sensitive services.

Typically, the number of subframes allocated for dedicated services might vary based on the respective service load but are configured across one or more radio frames in any order or pattern and either distributed across the frames or lumped into one radio frame. These dedicated (service-specific) subframes are indicated by the network to the UEs via Radio Resource Control (RRC) messages. For signalling efficiency, these service-specific subframes are typically defined by a bit pattern over a finite duration or period, usually expressed as a number of frames that repeat themselves periodically with a pre-defined periodicity. As an example, MBSFN subframes dedicated for broadcast/multicast services are defined to have a particular configuration specified in 3GPP TS 36.331 section 6.3.7 as follows:

```
-- ASN1START
MBSFN-SubframeConfig ::=        SEQUENCE {
    radioframeAllocationPeriod      ENUMERATED {n1, n2,
                                    n4, n8, n16, n32},
    radioframeAllocationOffset      INTEGER (0..7),
    subframeAllocation              CHOICE {
        oneFrame                    BIT STRING (SIZE(6)),
        fourFrames                  BIT STRING (SIZE(24))
    }
}
-- ASN1STOP
```

Using the MBSFNAreaConfiguration message, the defined aperiodic allocation pattern is periodically assigned to the MBMS service. The periodicity of the aperiodic allocation is set by the parameter commonSF-AllocPeriod.

MBSFNAreaConfiguration Message

```
-- ASN1START
MBSFNAreaConfiguration-r9 ::=    SEQUENCE {
     commonSF-Alloc-r9              CommonSF-
AllocPatternList-r9,
     commonSF-AllocPeriod-r9        ENUMERATED {
rf4, rf8, rf16, rf32, rf64, rf128, rf256},
     pmch-InfoList-r9               PMCH-InfoList-r9,
     nonCriticalExtension           MBSFNAreaConfiguration-v930-
IEs  OPTIONAL
}
MBSFNAreaConfiguration-v930-IEs ::= SEQUENCE {
     lateNonCriticalExtension       OCTET STRING
                 OPTIONAL,
     nonCriticalExtension           SEQUENCE { }
                 OPTIONAL
}
CommonSF-AllocPatternList-r9 ::= SEQUENCE (SIZE (1..maxMBSFN-
Allocations)) OF MBSFN-SubframeConfig
-- ASN1STOP
```

In this example, the subframeallocation element of the MBSFNConfiguration information element indicates the subframes which are dedicated to the broadcast services within one system frame or four system frames. Then this subframe assignment continues periodically with a period specified by the radioframeAllocationPeriod element, which, in this example, is expressed in terms of a number of frames. During these service-dedicated subframes, normal DL data transmission may be prohibited fully or partially (with some limited control signalling, such as PDCCH signalling which may be allowed).

While the embodiments herein describe the transmission of an UL grant to restart or reset an DRX inactivity timer, the DRX inactivity timer may be restarted via one or more other grants, messaging communications, control, signaling or broadcast messages. Further, instead of using the DRX inactivity timer, other timers, e.g., the onDuration timer or any other timer used for controlling the UE wake time could be used to extend the UE wake up time.

The following description focuses on when the UE's DRX wake up time, i.e. the time duration indicated by a DRX onDuration timer or the time indicated a DRX retransmission timer, collides or coincides with a periodic subframe such as an eMBMS subframe. In one example, the present disclosure extends the UE's wake up time by (re)starting or resetting a DRX inactivity timer. In that example, this restarting of the DRX inactivity timer can be triggered at the UE by sending an UL grant over the unused & available control region of the eMBMS sub frame.

Figure 2:
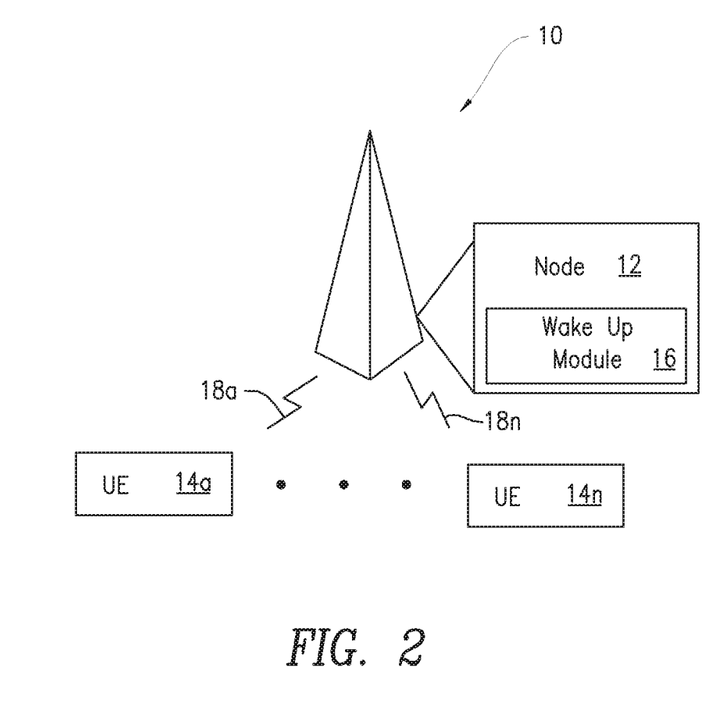
FIG. 2 is an example block diagram of communication system employing the DRX extension process constructed in accordance with the principles described herein.

Referring now to drawing figures in which like reference designators refer to like elements there is shown in FIG. 2 an exemplary system for utilizing grants to extend the DRX wake up time of a UE when the DRX wake up time collides or coincides with the periodic subframe, in accordance with the principles of the present disclosure and designated generally as "10." System 10 includes one or more nodes 12, one or more user equipments 14a-14n (collectively referred to as UE 14) and one or more networks 18. Node 12 may be a base station. In one embodiment, node 12 is an evolved Node B (eNB) in a Long Term Evolution (LTE) based network. Node 12 includes wake up module 16. In particular, wake up module 16 may include program instructions, which when executed by node 12, cause node 12 to perform the wake up extension process, discussed in detail with respect to FIGS. 5 and 7-12.

UE 14 may be a wireless device such as a mobile device, tablet and smartphone, among other wireless devices capable of using communication protocols known in the art, such as Internet Protocols, along with communication standards, such LTE standards, to communicate with node 12. Network 18 may include communication networks such as Internet Protocol based networks, wide area networks, local area networks, among other networks known in the art. For example, network 18 may be an LTE based network. Network 18 may provide various voice and data related services, content and the like to UE 14.

UE 14 includes one or more transmitters, and one or more receivers, for communication with node 12. In one embodiment, the UE transmitter and UE receiver may be replaced with one or more transceivers. UE 14 includes one or more processors. The UE processor may be one or more central processing units (CPUs) for performing UE wake time extension functions described herein. UE 14 includes a memory, e.g., non-volatile and volatile memory, such as hard drive, flash memory, memory stick and the like. Also, volatile memory may include random access memory and others known in the art. The UE memory may store program instructions such as those to perform wake up extension functions. For example, a UE wake up module includes instructions, which when executed by the UE processor, cause the UE processor to perform the wake up extension process, discussed in detail with respect to FIGS. 5 and 7-12.

In one example, the UE 14 may be configured to wake up during wake periods. If node 12 determines that a particular wake period collides or coincides with a periodic subframe such as an eMBMS subframe, the UE 14 receives a UL grant within the periodic subframe during that particular wake period. In that scenario, the UL grant is indicative of time-sensitive DL data that node 12 intends to send to the UE 14 in that particular wake period. In response to the UL grant received, the UE operates to restart (or start) its DRX inactivity timer to extend the active time so that the DL data can be received in the same wake period. Advantageously, by using the UL grant to extend the active time corresponding to that particular wake period, the time-sensitive DL data is not subject to additional delays which might otherwise be incurred if the DL data could only be sent in a subsequent wake period. Also, because only one wake period is extended and the UE DRX configuration does not need to be changed, the UE battery life is not substantially affected. In this example, only one wake period is extended but it is understood that in other examples, more than one wake period could be extended based on the receipt of one or more UL grant messages (or some other messages) extending the wake time as described above.

Figure 3:
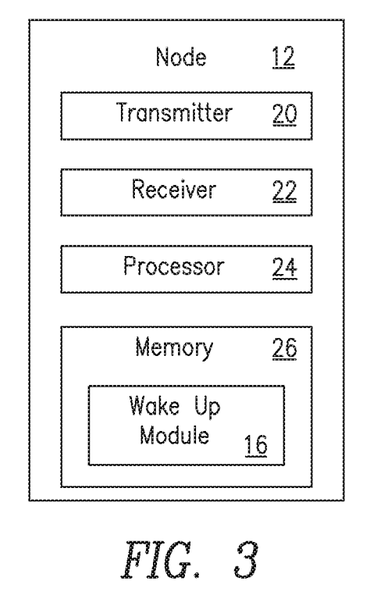
FIG. 3 is a block diagram of an exemplary node 12 constructed in accordance with the principles described herein.

FIG. 3 is a block diagram of an exemplary node 12. Node 12 includes one or more transmitters 20 and one or more receivers 22 for communication with UE 14, network 18 and other node 12s, among other nodes, devices and servers. In one embodiment, transmitter 20 and receiver 22 may be replaced with one or more transceivers. Node 12 includes one or more processors 24, e.g., central processing units (CPUs) within or associated with node 12 for performing node 12 functions described herein. Although not shown, it is understood that such functions may be distributed across two or more network nodes, e.g., node 12 and another network node. In the example of FIG. 3, node 12 includes memory 26 that stores wake up module 16, among other modules and data. In particular memory may include non-volatile and volatile memory. For example, non-volatile memory may include a hard drive, flash memory, memory stick and the like. Also, volatile memory may include random access memory and others known in the art. Memory 26 may store program instructions such as those for wake up module 16. For example, wake up module 16 includes instructions, which when executed by processor 24, cause processor 24 to perform the wake up extension process, discussed in detail with respect to FIGS. 5 and 7-12. Memory 26 may also include one or more buffers for storing data such as UE uplink and/or downlink data.

Figure 4:
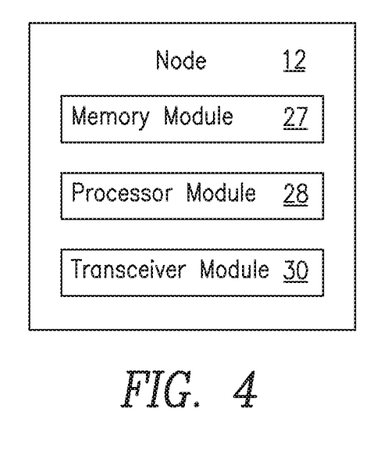
FIG. 4 is a block diagram of an alternative embodiment of node 12 constructed in accordance with the principles described herein.

FIG. 4 is a block diagram of an alternative embodiment of node 12. Node 12 includes memory module 27, processing module 28 and transceiver module 30 for performing the functions of node 12 described herein. Memory module 27 is configured to store data to be transmitted to UE 14, among other data associated with UE 14. Processing module 28 is configured to at least perform Blocks S100, S102 and S104-S116. Transceiver module 30 is configured to perform communications to and from UE 14, network 18 and other nodes 12.

Figure 5:
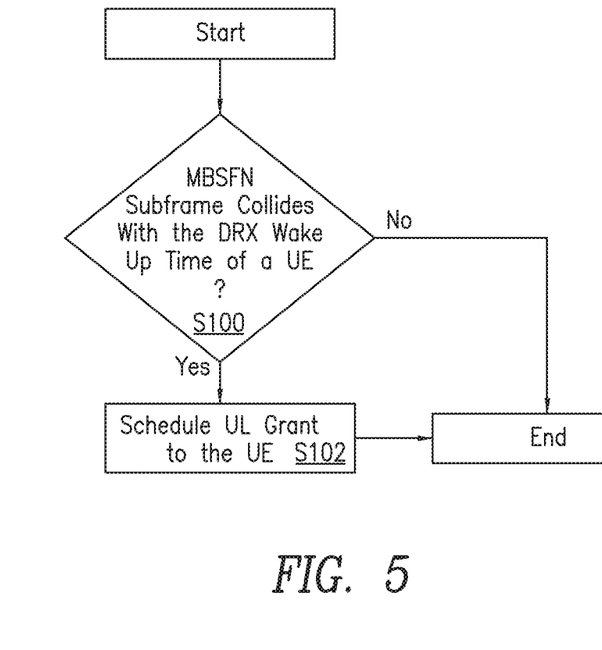
FIG. 5 is an example flow chart of the process for extending the wake up time in accordance with the principles described herein.

The process for extending the wake up time is described with reference to FIG. 5. A determination is made by node 12 as to whether MBSFN collides with the DRX wake up time and optionally an active Radio Access Bearer to be scheduled (Block 100). If the MBSFN does not collide, the process may end or return to Block S100. If the MBSFN does collide as determined in Block S100, an UL grant is scheduled to the UE (Block S102). Advantageously, in this example, the UL grant causes the UE to extend its wake time or active time sufficiently to be able to receive DL data that otherwise could not have been transmitted to the UE in that wake period. With this mechanism, VoLTE quality degradation due to these collisions may be avoided without the need to change the DRX configuration. The DRX wake time is only increased on an as needed basis, e.g., only for particular wake periods where a collision has been determined. Such an arrangement provides enhanced energy efficiency for the UE as compared with known techniques, i.e., provides increased battery life while still allowing transmission of stored, e.g., buffered, packets such as delay sensitive VoIP-LTE data packets.

Figure 6:
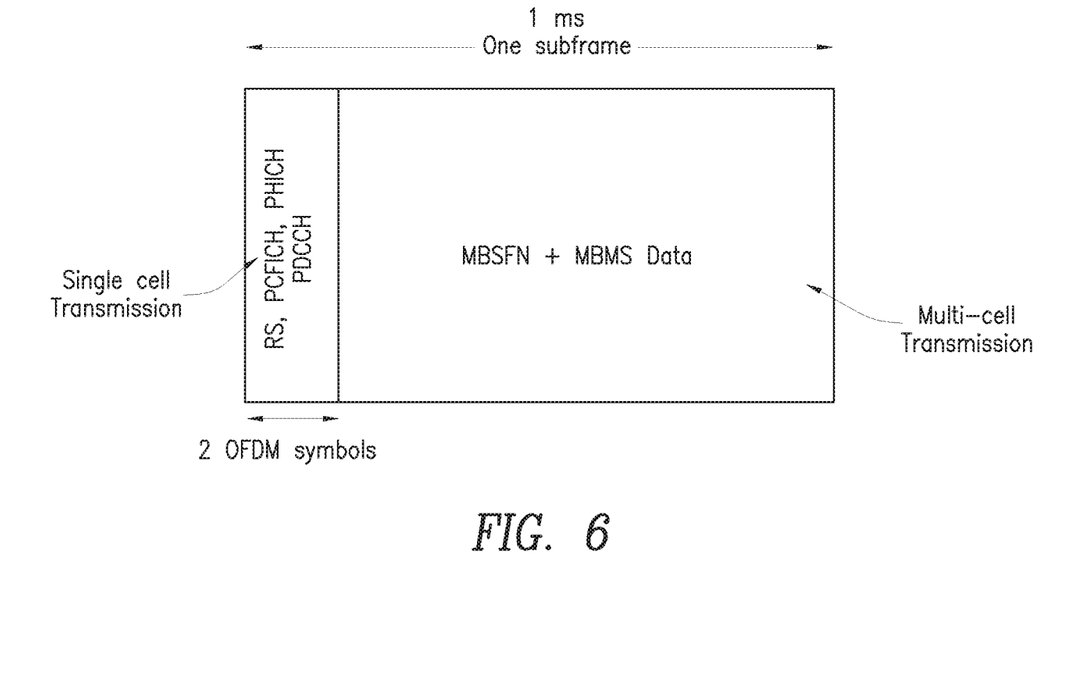
FIG. 6 is a block diagram of an example eMBMS subframe in accordance with the principles described herein.

FIG. 6, shows an example of a MBSFN subframe according to an embodiment of the present disclosure during which a UL grant is sent by node 12 to the UE 14. In this example, the MBSFN subframe is of a length spanning a 1 millisecond duration and consists of twelve Orthogonal Frequency Division Multiplexing (OFDM) symbols. Out of the twelve OFDM symbols within the eMBMS subframe, up to two OFDM symbols are available for unicast-related signaling such as, Reference Symbols (RS), Physical Control Format Indicator Channel (PCFICH), Physical Hybrid automatic-repeat-request Indicator Channel (PHICH) and PDCCH. In this embodiment, the UL grant is sent to the UE using the PDCCH. As illustrated, the OFDM symbols dedicated for unicast messaging are transmitted by each cell (node 12) to its connected UEs 14. The other OFDM symbols which are dedicated for MBMS traffic are used by all the cells within the MBSFN area to transmit the same content.

Figure 7:
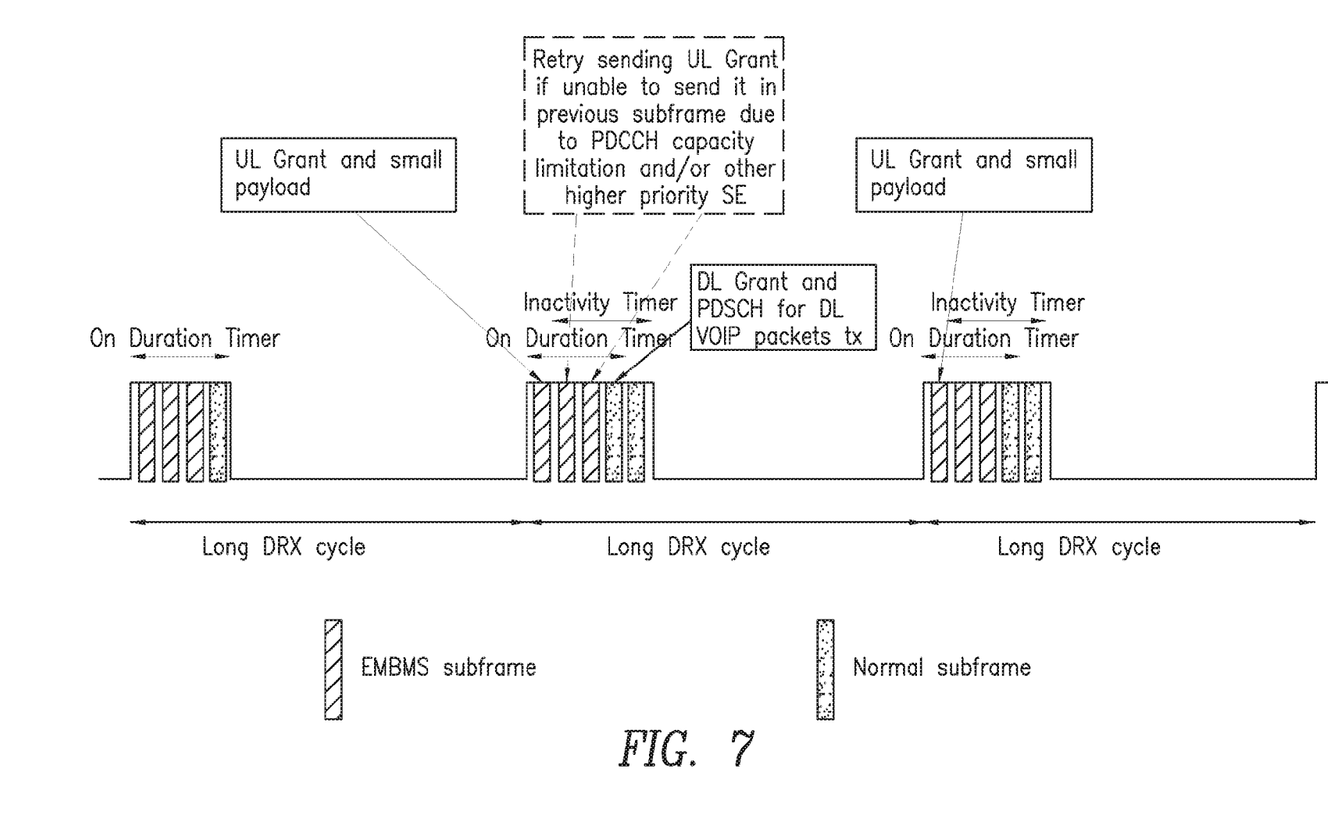
FIG. 7 is a diagram of an embodiment for the transmission of an UL grant with a small payload for restarting the DRX inactivity timer in the UE due to expiration of the DRX onDuration timer in accordance with the principles described herein.
Figure 8:
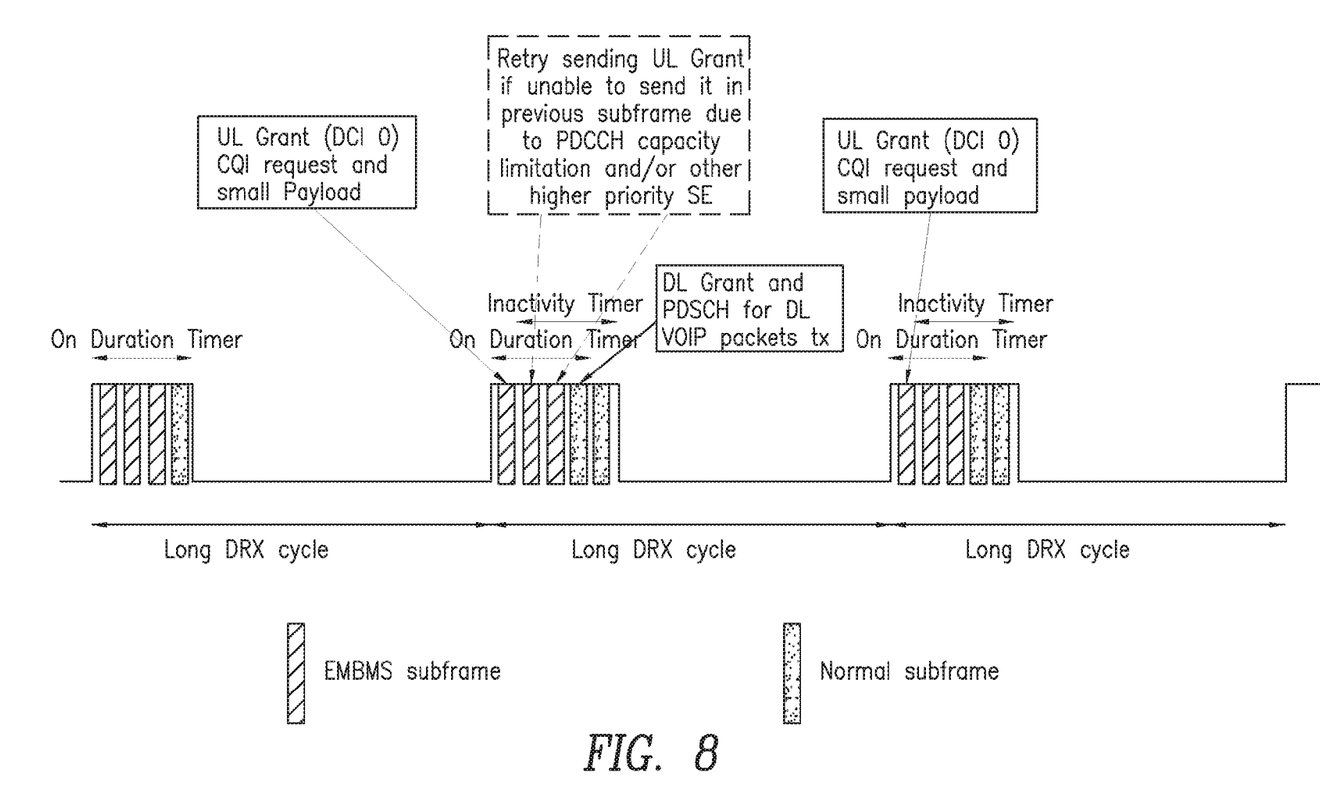
FIG. 8 is a diagram of another embodiment for the transmission of an UL grant with a small payload for restarting the DRX inactivity timer in the UE due to expiration of the DRX Onduration timer in accordance with the principles described herein.

FIG. 7 illustrates transmission of an UL grant with a small payload for restarting the DRX inactivity timer when UE 14 is awake due to running of the DRX Onduration timer. In this example, a UE, whose on-duration collides with the eMBMS subframes and a UE with DL data in the buffer, i.e., memory 26, extends its on-duration time so that the UE 14 is still awake in the next available non-EMBMS subframe to receive the DL data. As is shown, in a frame that includes three EMBMS subframes, the wake duration can be extended by extending the inactivity timer by sending an UL grant and small payload. This allows two normal subframes to be sent when none or only one could otherwise be sent due to the expiration of the on duration timer. In a case where a UL grant was not able to be sent in a subframe due to a PDCCH capacity limitation or other higher priority RAB, the UL grant is sent to UE 14 to extend the inactivity timer.

The method to extend the on-duration is discussed below. The method uses triggering of the DRX inactivity timer of the UE. Node 12 transmits an UL grant with a Transport Block Size (TBS) that can carry a payload, i.e. the TBS is not equal to zero, to the UE 14. An aperiodic Channel Quality Indication (CQI) request can be multiplexed with a non-zero TBS. For example, node 12 may send Media Access Control (MAC) Control Element (CE) requesting buffer status report from UE 14. The size of the grant can be such that a BSR can be transmitted by UE 14. Finally when the actual VoLTE packet is transmitted over the DL, node 12 can also include a DRX command, such as MAC CE, to reactivate the DRX process. In one embodiment illustrated in FIG. 8, the UL grant uses the Downlink Control Indicator (DCI) Format 0.

Figure 9:
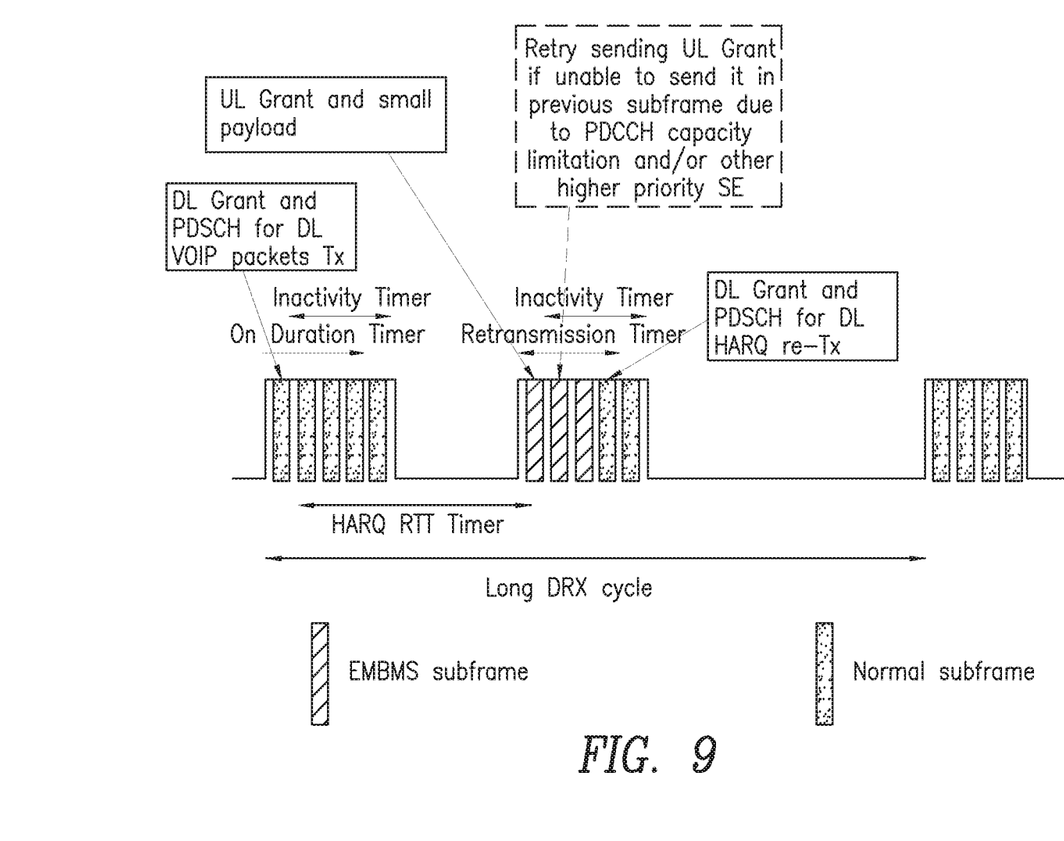
FIG. 9 is a diagram of yet another embodiment for the transmission of an UL grant with a small payload for restarting the DRX inactivity timer when the retransmission timer is running in the UE in accordance with the principles described herein.
Figure 10:
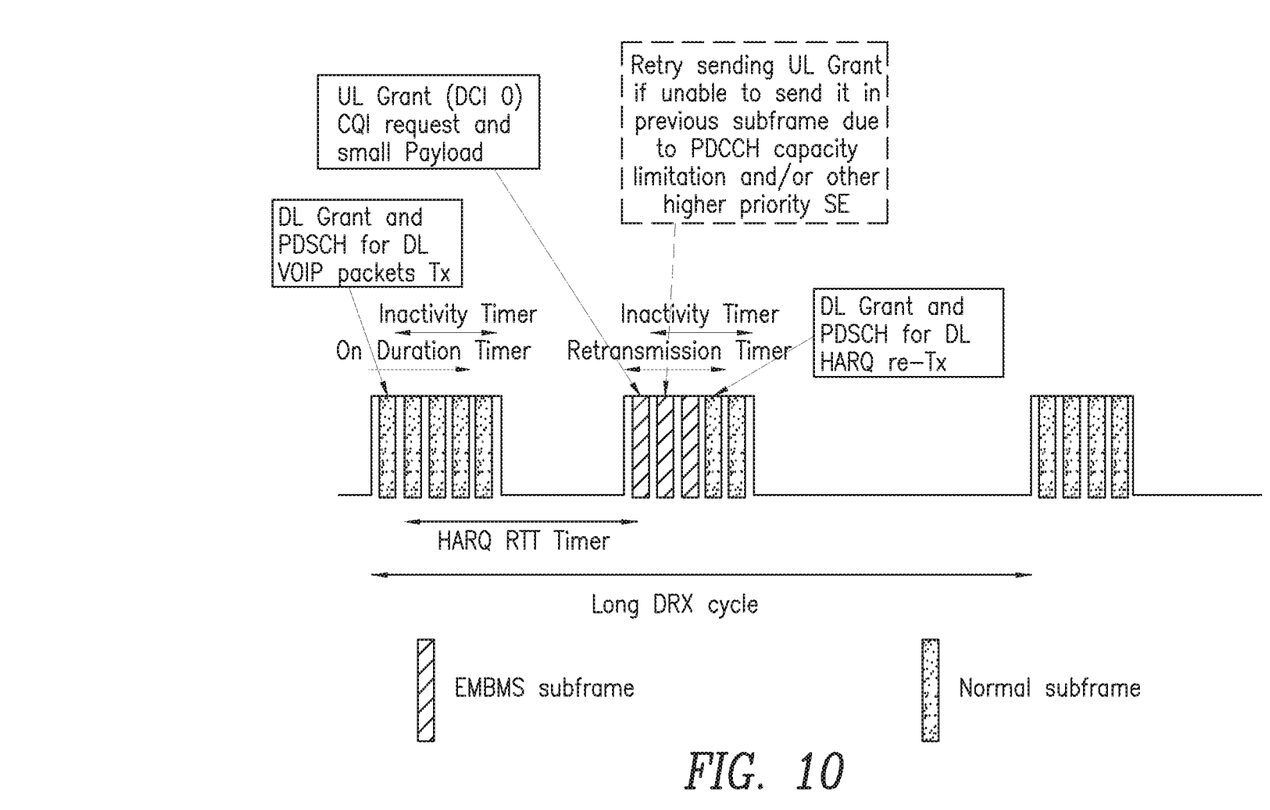
FIG. 10 is a diagram of yet another embodiment for the transmission of an UL grant with a small payload for restarting the DRX inactivity timer in the UE when the DRX retransmission timer is running in accordance with the principles described herein.

FIG. 9 illustrates an example of transmission of an UL grant with a small payload for restarting the DRX inactivity timer when UE 14 is awake and while the DRX retransmission timer is running, i.e., during Hybrid Automatic Repeat Request (HARQ) re-transmission. The configured DRX Retransmission Timer for VoLTE is usually very short (typically 2 subframes). In this case the DL HARQ re-transmission cannot be sent if both subframes are eMBMS subframes. If the DRX re-transmission time collides with eMBMS subframes, the wake time needs to be extended so that UE 14 is still awake in the next available non-EMBMS subframe to receive the re-transmission message. In this example, node 12 transmits an UL grant with a payload unequal to zero to UE 14 on a retransmission subframe that collides with eMBMS. Upon receiving the UL grant, UE 14 will start its inactivity timer to extend its active time. Node 12 schedules the DL HARQ re-transmission on the next available non-eMBMS sub-frame.

If the DRX wake time of UE 14 coincides with eMBMS subframes, the DRX wake time of UE 14 is extended to a non-eMBMS subframe by starting the DRX Inactivity timer of UE 14. Node 12 can then transmit unicast data on that non-eMBMS subframe. This is of particular relevance for delay sensitive services like VoIP. In one embodiment illustrated in FIG. 10, the UL grant is in the Downlink Control Indicator (DCI) Format 0.

Figure 11:
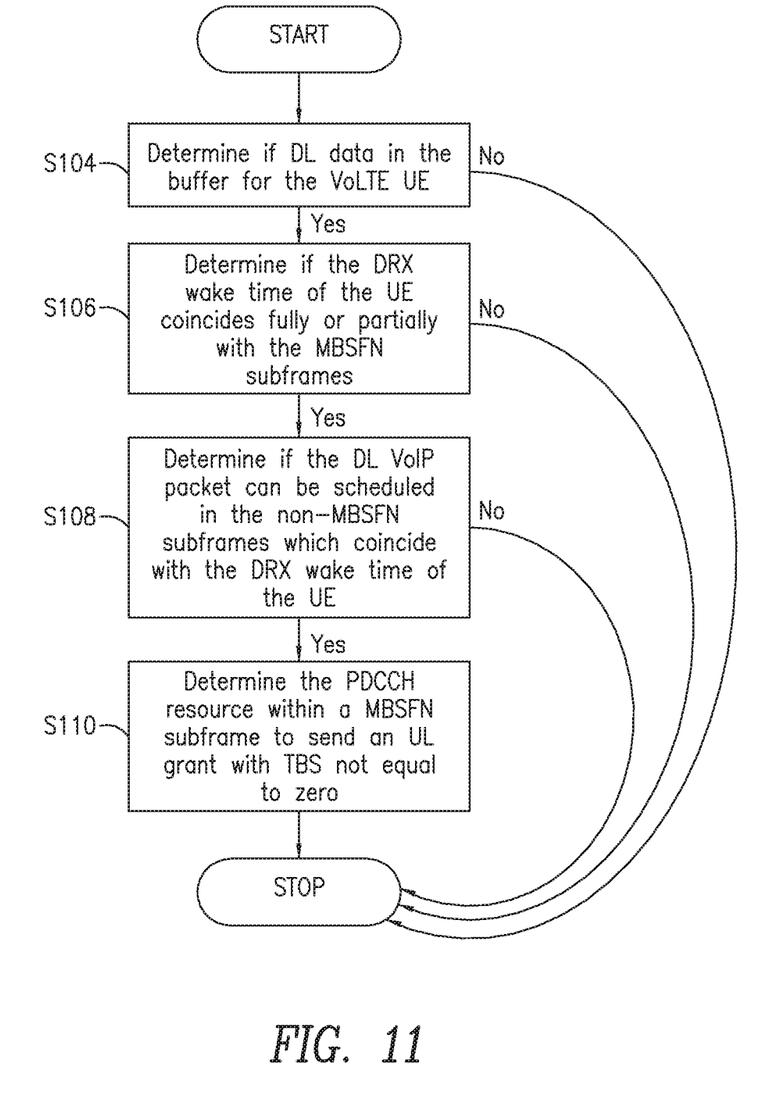
FIG. 11 is an example flow chart of functions the base station node performs before transmitting the UL grant to the UE in accordance with the principles described herein.

FIG. 11 illustrates another example of the various functions node 12 performs before transmitting the UL grant to UE 14. As shown in FIG. 11, node 12 checks to determine whether there is data in the buffer for DL transmission for each VoLTE UE 14 (Block S104). If there is data, the radio resource management entity in node 12 checks if the DRX wake time in the next scheduling instance for UE 14 coincides with an eMBMS subframe allocation (Block S106). Furthermore, the serving cell, i.e., serving node 12, should check to determine whether there are non-MB SFN subframes within the DRX wake time and whether these subframes can accommodate the DL transmission (Block S108). The expected system load may influence the outcome of this determination. If both the above checks determine that there is a high probability that the VoLTE UE cannot be accommodated during its upcoming DRX wake time, the scheduler of node 12 schedules a PDCCH to that UE 14 with a grant with non-zero TB S (Block S110). This PDCCH is sent anytime during the DRX wake time of UE 14. Note that the scheduling of this PDCCH in this example ensures that UE 14 will extend its DRX wake time for a time period equivalent to its DRX inactivity timer value. The resource block assignment in the PDCCH is set to a non-zero value to guarantee that UE 14 will restart its inactivity timer.

Figure 12:
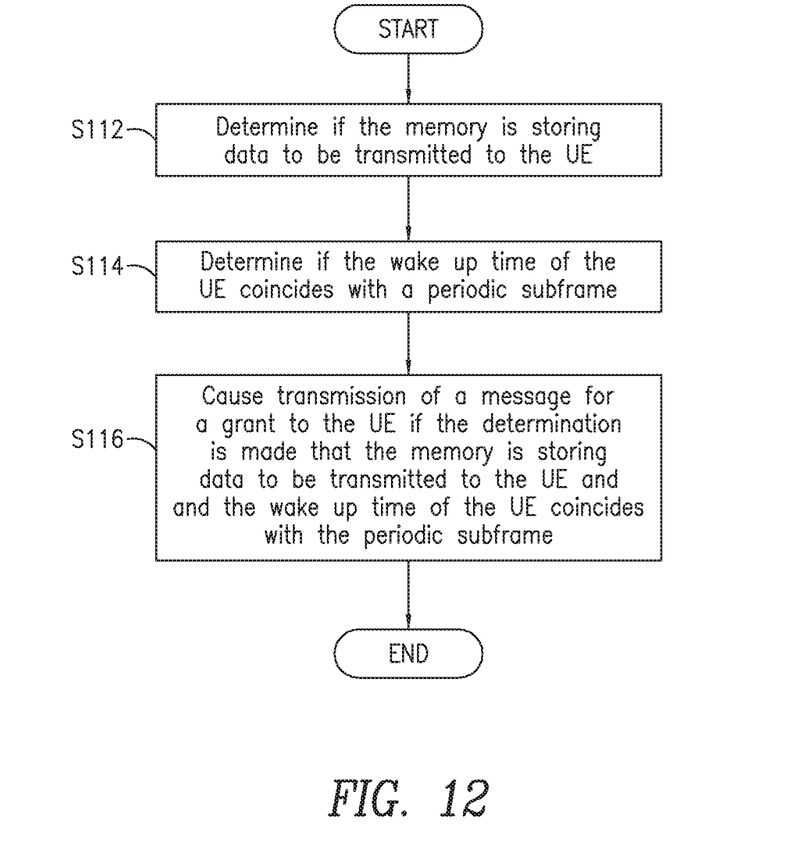
FIG. 12 is an example flow chart for dynamically handling collisions between periodic subframes and DRX wake up times by extending the DRX wake up time.

An exemplary process for dynamically handling a collision between periodic subframes and DRX wake up times by extending the DRX wake up time is explained with reference to FIG. 12. Processor 24 determines if memory 26 is storing data to be transmitted to UE 14 (Block S112). Processor 24 determines if the wake up time of UE 14 coincides with a periodic subframe (Block S114). In one embodiment, the periodic subframe is an eMBMS subframe. Processor 24 causes transmission of a message for a grant to UE 14 if the determination is made that memory 26 is storing data to be transmitted to UE 14 and the wake up time of UE 14 coincides with the periodic subframe (Block S116). In one embodiment, the grant is an uplink grant in which the uplink grant to the UE is transmitted within at least one Physical Downlink Control Channel (PDCCH) resource of the periodic subframe.

The following is also noted in accordance with other contemplated embodiments:

Embodiment 1 provides: A node for extending a wake up time of a wireless user equipment (UE), the node comprising:
a memory module, the memory module configured to store data to be transmitted to the UE;
a processor module, the processor module configured to:
determine if the memory is storing data to be transmitted to the UE;
determine if the wake up time of the UE coincides with a periodic subframe, the periodic subframe occurring with a periodicity; and
cause transmission of a message for a grant to the UE if the determination is made that the memory is storing data to be transmitted to the UE and the wake up time of the UE coincides with the periodic subframe.

Embodiment 2 provides: The node of Embodiment 1, wherein the grant to the UE is configured to cause the UE to extend the wake up time of the UE, the grant to the UE being transmitted to the UE during a non-extended portion of the wake up time of the UE.

Embodiment 3 provides: The node of Embodiment 2, wherein the data to be transmitted to the UE is scheduled for transmission after the periodic subframe and within a non-periodic subframe during the extended wake up time of the UE.

Embodiment 4 provides: The node of Embodiment 1, wherein the wake up time of the UE is a discontinuous reception (DRX) active time.

Embodiment 5 provides: The node of Embodiment 1, wherein the message for grant to the UE is configured to cause the UE to reset a DRX inactivity timer of the UE.

Embodiment 6 provides: The node of Embodiment 1, wherein the subframe is one of a set of subframes defining a frame.

Embodiment 7 provides: The node of Embodiment 6, wherein the periodicity is a number of frames.

Embodiment 8 provides: The node of Embodiment 1, wherein the data to be transmitted to the UE is a retransmission and wherein the determination that the wake up time of the UE coincides with the periodic subframe comprises a determination that a scheduled time for the retransmission coincides with the periodic subframe.

Embodiment 9 provides: The node of Embodiment 1, wherein the periodic subframe is a Multimedia Broadcast Multicast Server (MBMS) subframe.

Embodiment 10 provides: The node of Embodiment 1, wherein the data to be transmitted to the UE is Voice over Internet Protocol (VoIP) data.

Embodiment 11 provides: The node of Embodiment 1, wherein the message for grant to the UE is an uplink grant to the UE.

Embodiment 12 provides: The node of Embodiment 11, wherein the uplink grant to the UE is transmitted within the periodic subframe.

Embodiment 13 provides: The node of Embodiment 12, wherein the uplink grant indicates a non-zero Transport Block Size (TBS).

Embodiment 14 provides: The node of Embodiment 11, wherein the uplink grant to the UE is transmitted within at least one Physical Downlink Control Channel (PDCCH) resource of the periodic subframe.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A node for extending a wake up time of a wireless user equipment (UE), the node comprising:
a memory, the memory configured to store data to be transmitted to the UE;
a processor, the processor configured to:
determine if the memory is storing data to be transmitted to the UE;
determine if the wake up time of the UE coincides with a periodic subframe, the periodic subframe occurring with a periodicity; and
cause transmission of a message for a grant to the UE if the determination is made that the memory is storing data to be transmitted to the UE and the wake up time of the UE coincides with the periodic subframe, the grant to the UE being configured to cause the UE to extend the wake up time of the UE, the grant to the UE being transmitted to the UE during a non-extended portion of the wake up time of the UE, and the data to be transmitted to the UE being scheduled for transmission after the periodic subframe and within a non-periodic subframe during the extended wake up time of the UE.

2. The node of claim 1, wherein the wake up time of the UE is a discontinuous reception (DRX) active time.

3. The node of claim 1, wherein the message for grant to the UE is configured to cause the UE to reset a discontinuous reception (DRX) inactivity timer of the UE.

4. The node of claim 1, wherein the subframe is one of a set of subframes defining a frame.

5. The node of claim 4, wherein the periodicity is a number of frames.

6. The node of claim 1, wherein the data to be transmitted to the UE is a retransmission and wherein the determination that the wake up time of the UE coincides with the periodic subframe comprises a determination that a scheduled time for the retransmission coincides with the periodic subframe.

7. The node of claim 1, wherein the periodic subframe is a Multimedia Broadcast Multicast Server (MBMS) subframe.

8. The node of claim 1, wherein the data to be transmitted to the UE is Voice over Internet Protocol (VoIP) data.

9. The node of claim 1, wherein the message for grant to the UE is an uplink grant to the UE.

10. The node of claim 9, wherein the uplink grant to the UE is transmitted within the periodic subframe.

11. The node of claim 10, wherein the uplink grant indicates a non-zero Transport Block Size (TBS).

12. The node of claim 9, wherein the uplink grant to the UE is transmitted within at least one Physical Downlink Control Channel (PDCCH) resource of the periodic subframe.

13. A method for extending a wake up time of a wireless user equipment (UE), the method comprising:
determining if a memory of a node is storing data to be transmitted to the UE;
determining if the wake up time of the UE coincides with a periodic subframe, the periodic subframe occurring with a periodicity; and
causing transmission of a message for a grant to the UE if the determination is made that the memory is storing data to be transmitted to the UE and the wake up time of the UE coincides with the periodic subframe, the grant to the UE being configured to cause the UE to extend the wake up time of the UE, the grant to the UE being transmitted to the UE during a non-extended portion of the wake up time of the UE, and the data to be transmitted to the UE being scheduled for transmission after the periodic subframe and within a non-periodic subframe during the extended wake up time of the UE.

14. The method of claim 13, wherein the wake up time of the UE is a discontinuous reception (DRX) active time.

15. The method of claim 13, wherein the message for grant to the UE is configured to cause the UE to reset a discontinuous reception (DRX) inactivity timer of the UE.

16. The method of claim 13, wherein the subframe is one of a set of subframes defining a frame.

17. The method of claim 16, wherein the periodicity is a number of frames.

18. The method of claim 13, wherein the data to be transmitted to the UE is a retransmission and wherein the determination that the wake up time of the UE coincides with the periodic subframe comprises determining that a scheduled time for the retransmission coincides with the periodic subframe.

19. The method of claim 13, wherein the periodic subframe is a Multimedia Broadcast Multicast Server (MBMS) subframe.

20. The method of claim 13, wherein the data to be transmitted to the UE is Voice over Internet Protocol (VoIP) data.

21. The method of claim 13, wherein the message for grant to the UE is an uplink grant to the UE.

22. The method of claim 21, wherein the uplink grant to the UE is transmitted within the periodic subframe.

23. The method of claim 22, wherein the uplink grant indicates a non-zero Transport Block Size (TBS).

24. The method of claim 21, wherein the uplink grant to the UE is transmitted within at least one Physical Downlink Control Channel (PDCCH) resource of the periodic subframe.

* * * * *